US010315935B2

(12) United States Patent
Powell et al.

(10) Patent No.: US 10,315,935 B2
(45) Date of Patent: Jun. 11, 2019

(54) APPARATUS, SYSTEMS, AND METHODS FOR REMOVING TOTAL DISSOLVED SOLIDS FROM A FLUID

(71) Applicant: 1934612 Ontario Inc., London (CA)

(72) Inventors: Anthony L. Powell, London (CA); Brian E. Butters, London (CA)

(73) Assignee: 1934612 Ontario Inc., London, Ontario (CA)

( * ) Notice: Subject to any disclaimer, the term of this patent is extended or adjusted under 35 U.S.C. 154(b) by 638 days.

(21) Appl. No.: 14/681,907

(22) Filed: Apr. 8, 2015

(65) Prior Publication Data

US 2015/0284271 A1 Oct. 8, 2015

Related U.S. Application Data

(60) Provisional application No. 61/976,702, filed on Apr. 8, 2014.

(51) Int. Cl.
*B01D 61/02* (2006.01)
*B01D 63/06* (2006.01)
(Continued)

(52) U.S. Cl.
CPC .............. *C02F 1/44* (2013.01); *B01D 69/02* (2013.01); *C04B 38/00* (2013.01); *B01D 61/02* (2013.01);
(Continued)

(58) Field of Classification Search
CPC ........ B01D 2311/04; B01D 2311/2642; B01D 61/14; B01D 69/02; B01D 61/00; C02F 1/42; C02F 1/52; C02F 3/00; C02F 9/00
See application file for complete search history.

(56) References Cited

U.S. PATENT DOCUMENTS 5,997,743 A 12/1999 Ahn et al.
6,214,204 B1 4/2001 Gadkaree et al.

FOREIGN PATENT DOCUMENTS

| CN | 201713403 | 1/2011 |
| JP | H05-309237 | 11/1993 |
| JP | 2008-238030 | 10/2008 |

OTHER PUBLICATIONS

International Search Report dated Jan. 25, 2016 in related PCT application No. PCT/IB2015/001421.
(Continued)

*Primary Examiner* — Ana M Fortuna
(74) *Attorney, Agent, or Firm* — Baker & McKenzie LLP

(57) ABSTRACT

The present disclosure relates, according to some embodiments, to systems, apparatus, and methods for fluid purification (e.g., water) with a ceramic elements configured to remove solids (e.g., particles) and charged particles (e.g., dissolved salts). For example, the present disclosure relates, in some embodiments, to a cross-flow fluid ceramic element comprising (a) an elongate ceramic membrane filter having a first filter end, a second filter end, at least one filter side, and at least one interior channel spanning the length of the filter, (b) a first ion removal unit comprising a first substrate having a first net polarity (e.g., innately or upon application of a current) configured to reversibly bind ions of opposite polarity, and (c) a second ion removal unit comprising a second substrate having a second net polarity (e.g., innately or upon application of a current) configured to reversibly bind ions of opposite polarity, wherein the first and second polarity are opposite of each other.

22 Claims, 8 Drawing Sheets
(2 of 8 Drawing Sheet(s) Filed in Color)

(51) Int. Cl.
  *C02F 1/44* (2006.01)
  *B01D 69/02* (2006.01)
  *B01D 71/02* (2006.01)
  *C04B 38/00* (2006.01)
  C02F 1/42 (2006.01)
  B01D 61/14 (2006.01)
  C04B 111/00 (2006.01)

(52) U.S. Cl.
  CPC .......... *B01D 61/14* (2013.01); *B01D 63/066* (2013.01); *B01D 71/02* (2013.01); *B01D 2311/04* (2013.01); *B01D 2311/2603* (2013.01); *B01D 2311/2642* (2013.01); *B01D 2325/26* (2013.01); *C02F 1/42* (2013.01); *C02F 1/442* (2013.01); *C02F 1/444* (2013.01); *C02F 2001/422* (2013.01); *C02F 2001/425* (2013.01); *C04B 2111/00801* (2013.01)

(56) References Cited

OTHER PUBLICATIONS

Partial Supplementary European Search Report dated Nov. 13, 2018 in connection with European Application No. 15789284.5, 14 pages.
Rasel Das et al., "Carbon Nanotube Membranes for Water Purification: A Bright Future in Water Desalination", Desalination, vol. 336, Mar. 1, 2014, pp. 97-109, XP055187991.
Extended European Search Report dated Feb. 13, 2018 in connection with European Application No. 15789284.5, 11 pages.
European Examination Report dated Jan. 23, 2019 in connection with European Application No. 15789284.5, 5 pages.

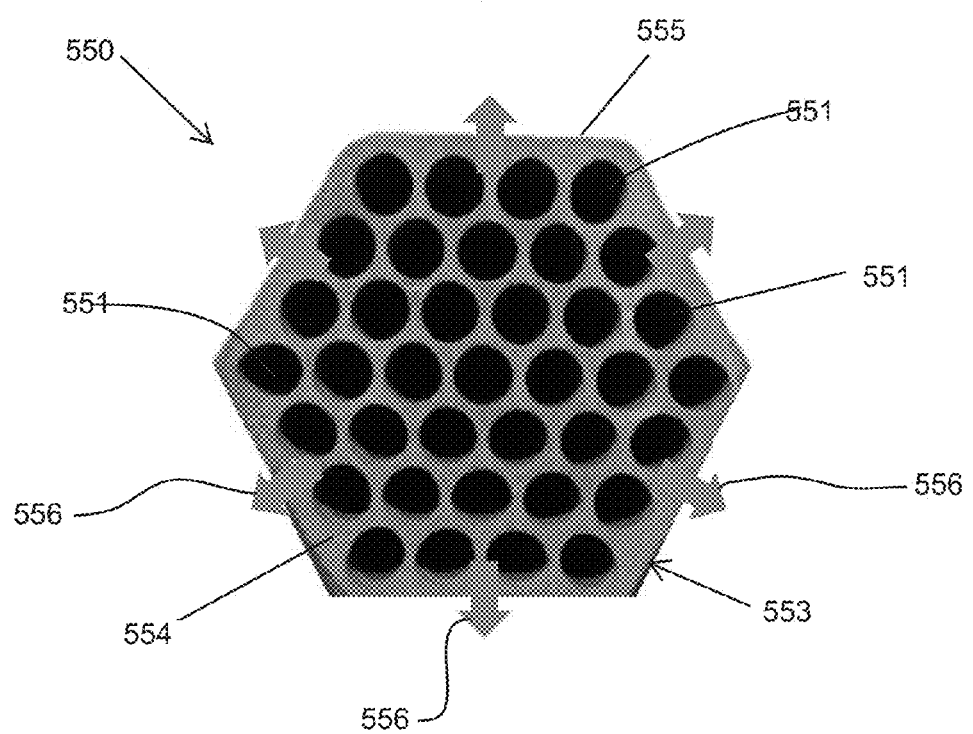

APPARATUS, SYSTEMS, AND METHODS FOR REMOVING TOTAL DISSOLVED SOLIDS FROM A FLUID

CROSS-REFERENCE TO RELATED APPLICATION

This application claims priority to U.S. Application No. 61/976,702, filed on Apr. 8, 2014, which is incorporated herein by reference in its entirety.

FIELD OF THE DISCLOSURE

The present disclosure relates, in some embodiments, to systems, apparatus, and methods for decontaminating a fluid (e.g., water) with a ceramic membrane.

BACKGROUND OF THE DISCLOSURE

Since almost all forms of life need water to survive, the improvement of water quality in decontamination systems has typically been a subject of significant interest. As a result, treatment systems and techniques for removing contaminants from contaminated fluids have been developed in the past. Approaches include water treatment by applying various microorganisms, enzymes and nutrients for the microorganisms in water. Other approaches involve placing chemicals in the contaminated fluids, such as chlorine, in an effort to decontaminate supplies. These additives can, however, create more problems than they solve. Some approaches avoid the use of added chemicals or microorganisms by using a filtration strategy. Such systems have either failed or failed to realize their potential, such that challenges remain.

SUMMARY

Accordingly, a need has arisen for improved fluid purification. For example, a need exists for fluid purification systems, apparatus, and methods that reduce the number of steps required for fluid purification and/or reduce the number of component operating units. The present disclosure relates, in some embodiments, to a purification unit comprising two or more elongate ceramic elements, wherein at least one of the elongate ceramic membrane elements is configured to separate, exclude, and/or remove contaminants (e.g., particles) on the basis of their size and at least one of the elongate ceramic membrane elements is configured to separate, exclude, and/or remove contaminants (e.g., polar, ionized, and ionizable contaminants) on the basis of their charge (e.g., total charge, net charge).

The present disclosure relates, in some embodiments, to a fluid purification system. For example, a fluid purification system may comprise (a) a first operational unit configured to separate, exclude, and/or remove contaminants on the basis of size and form a first partially purified permeate; (b) a second operational unit configured to receive the first permeate from the first unit and separate, exclude, and/or remove from the first permeate charged contaminants having a first polarity to form a second partially purified permeate; and/or (c) optionally, a third operational unit to receive the second permeate from the second unit and separate, exclude, and/or remove from the second permeate charged contaminants having a polarity opposite of the first polarity to form an output fluid. In some embodiments, each operational unit may comprise at least one ceramic element. Each ceramic element may comprise up to about 100% silicon carbide. According to some embodiments, the second and third operational units each comprise at least one ceramic element and each of these ceramic elements have a substrate comprising at least one dopant (e.g., boron, aluminum, nitrogen, or combinations thereof). In some embodiments, a fluid purification system may exclude any other operational elements beyond the ones recited here.

According to some embodiments, the present disclosure relates to methods for separating, excluding, and/or removing ("removing") one or more contaminants from a contaminated media. A method may comprise, for example, (a) providing a contaminated media feed comprising at least one species of a solid contaminant and at least one species of a dissolved salt contaminant, (b) aggregating the dissolved contaminant into particles, (c) removing the particles to form a first partially purified media, (d) contacting the first partially purified media with a first substrate having a net charge of a first polarity under conditions that permit oppositely charged salt ions having a second polarity, opposite of the first, to bind to the first substrate to form a second partially purified media, and/or (e) optionally contacting the first partially purified media with a second substrate having a net charge of the second polarity under conditions that permit oppositely charged salt ions having the first polarity to bind to the second substrate to form a second partially purified media, wherein the first and/or the second partially purified media has a lower concentration of the at least one species of a solid contaminant and a lower concentration of the at least one species of a dissolved salt contaminants than the contaminated media feed. In some embodiments, aggregating a dissolved contaminant into particles further comprises oxidizing, reducing, precipitating, and/or coagulating the contaminants. Aggregating a dissolved contaminant into particles may comprise, in some embodiments, contacting a contaminated media with a coagulant, a base, air, dissolved oxygen, and/or other chemicals to permit and/or promote metal oxidation, reduction, chemical precipitation, chemical coagulation, or combinations thereof.

The present disclosure relates, in some embodiments, to methods for separating, excluding, and/or removing ("removing") one or more contaminants from a contaminated media comprising a suspended or dissolved contaminant and a dissolved salt contaminant. A method may comprise, for example, (a) filtering the contaminated media on the basis of size to remove the suspended or dissolved contaminant to form a first partially purified media, (b) contacting the first partially purified media with a first substrate having a net charge of a first polarity under conditions that permit contaminant salt ions having a second polarity, opposite of the first, to bind to the first substrate to form a second partially purified media, and/or (c) contacting the first partially purified media with a second substrate having a net charge of the second polarity under conditions that permit contaminant salt ions having the first polarity to bind to the second substrate to form a second partially purified media, wherein the second partially purified media has a lower concentration of solid contaminants and a lower concentration of dissolved salt contaminants than the contaminated media feed. In some embodiments, the first substrate and/or second substrate may independently comprise boron, aluminum, nitrogen, or combinations thereof. In some embodiments, at least a portion of the dissolved salt contaminant (e.g., some of the contaminant particles or molecules in the fluid) may absorb to the first substrate and/or second substrate. A method may further comprise reversing the net charge of the first substrate to desorb contaminant salt ions having a second polarity and bound to the first substrate and/or reversing the net charge of the second substrate to desorb contaminant salt ions having a first polarity and bound to the second substrate.

In some embodiments, the present disclosure relates to fluid purification modules. A fluid purification module may comprise, for example, (a) a contaminated media chamber; (b) a permeate chamber; and (c) at least one ceramic element between the contaminated media chamber and the permeate chamber. Each ceramic element may comprise (i) a porous ceramic substrate having a first surface facing the contaminated media chamber and a second surface facing the permeate chamber, (ii) at least one channel extending through the substrate, each channel in fluid communication with the contaminated media chamber, and (iii) a membrane positioned between the contaminated media chamber and the substrate, the membrane configured to permit passage of particles below a size cut off and prevent passage of larger particles, wherein the ceramic substrate is configured to have a net charge (x) in the absence of an applied electric current or (y) upon application of an electric current. In some embodiments, each ceramic substrate may comprise up to about 100% silicon carbide. Each ceramic substrate may comprise, according to some embodiments, at least one dopant (e.g., boron, aluminum, nitrogen, or combinations thereof). In some embodiments, a ceramic element may have a positive net charge or a negative net charge.

The present disclosure relates to contaminant removal systems according to some embodiments. For example, a contaminant removal system may comprise (a) a contaminated media inlet; (b) a high solids contact reactor in fluid communication with the contaminated media inlet; (c) a crossflow purification module, and (d) a dead-end purification module. In some embodiments, a crossflow purification module may be configured to (i) permit passage of particles below a size cut off and prevent passage of larger particles, (ii) prevent passage of particles having a net charge of a first polarity, and (iii) permit passage of particles having no net charge, particles having a net charge of a second polarity, or combinations thereof. A dead-end purification module may be configured, according to some embodiments, to (i) prevent passage of particles having a net charge of the second polarity. In some embodiments, the first polarity may be positive.

In some embodiments, a contaminant removal system may comprise (a) a contaminated media source; and (b) a ceramic element series. A ceramic element may comprise (1) a first ceramic element (i) in fluid communication with the contaminated media source, (ii) comprising a first substrate and a first membrane covering at least a portion of the substrate, and (iii) configured to remove particles on the basis of size and form a first permeate; (2) a second ceramic element (i) comprising a second substrate and, optionally, a second membrane covering at least a portion of the second substrate, (ii) in fluid communication with the first ceramic element to receive the first permeate, and (iii) configured to remove contaminants having a first net charge and form a second permeate; and (3) optionally a third ceramic element (i) comprising a third substrate and, optionally, a third membrane covering at least a portion of the third substrate, (ii) in fluid communication with the second ceramic element to receive the second permeate, and (iii) configured to remove contaminants having a second net charge and form a third permeate. In some embodiments of a contaminant removal system the first net charge may be a positive charge. The second element may comprise a charged material having, for example, a polarity opposite of the first net charge. The second element may comprise a charged material that acquires a polarity opposite of the first net charge, for example, upon the application of a current. The third second element may comprise a charged material having, for example, a polarity opposite of the second net charge. The third element may comprise a charged material that acquires a polarity opposite of the second net charge, for example, upon the application of a current. In some embodiments, the optional second membrane is absent, the optional third membrane is absent, the first element is further configured to support crossflow operation, the second element is further configured to support dead-end operation, and/or the third element is further configured to support dead-end operation. In some contaminant removal systems, a first substrate may comprise up to 100% (w/w) silicon carbide, a second substrate may comprise silicon carbide and a dopant (e.g., boron, aluminum, nitrogen, or combinations thereof), and/or a third substrate may comprise silicon carbide and a dopant (e.g., boron, aluminum, nitrogen, or combinations thereof).

The present disclosure relates, in some embodiments, to fluid purification systems. A fluid purification system may comprise, for example, (a) a first purification module comprising a first ceramic element, the first ceramic element comprising a first substrate and a first membrane covering at least a portion of the substrate and configured (i) to receive a contaminated media feed comprising contaminant particles and contaminant ions, (ii) to remove from the contaminated media particles on the basis of size, and (iii) to form a first partially purified permeate; (b) a second purification module comprising a second ceramic element, the second ceramic element comprising a second substrate and configured (i) to receive the first partially purified permeate from the first element, (ii) to remove from the first partially purified permeate contaminants having a first net charge, and (iii) form a second partially purified permeate; and (c) a third purification module comprising a third ceramic element, the third ceramic element comprising a third substrate and configured (i) to receive the second partially purified permeate from the second element, (ii) to remove from the second partially purified permeate contaminants having a second net charge, and (iii) form an output fluid comprising lower concentrations of particles and lower concentrations of ions than the contaminated media feed, wherein the first net charge has the opposite polarity of the second net charge. In some embodiments, the second substrate and/or the third substrate may comprise a dopant (e.g., boron, aluminum, nitrogen, or combinations thereof).

According to some embodiments, the present disclosure relates to methods for removing contaminants from a contaminated media. A method may be configured to operate on a media or fluid comprising, for example, a suspended or dissolved contaminant and a polar contaminant, at least a portion of which has a first polarity and/or a second polarity (e.g., a portion having a first polarity and a portion having a second polarity or a zwitterionic portion having both a first and second polarity on each particle or molecule). A method may comprise, for example, (a) filtering a contaminated media on the basis of size to remove suspended or dissolved contaminant to form a first partially purified media; (b) contacting the first partially purified media with a first substrate that may have a net charge of a first polarity under conditions that permit any dissolved polar contaminant having the second polarity, opposite of the first, to bind to the first substrate to form a second partially purified media; (c) contacting the first partially purified media and/or the second partially purified media with a second substrate that may have a net charge of the second polarity under conditions that permit the dissolved polar contaminant having the first polarity to bind to the second substrate to form a second partially purified media. In some embodiments, the second partially purified media may have a lower concentration of one or more solid contaminants and a lower concentration of one or more dissolved polar contaminants than the contaminated media feed.

In some embodiments, a first substrate and/or second substrate each (e.g., independently) may comprise boron, aluminum, nitrogen, or combinations thereof. In some embodiments, at least a portion of a dissolved polar contaminant may absorb to a first substrate. A method may further comprise altering (e.g., reversing) the net charge of the first substrate to desorb any absorbed polar contaminant having a second polarity. At least a portion of the dissolved polar contaminant may absorb to a second substrate. A method may further comprise altering (e.g., reversing) the net charge of the second substrate to desorb any absorbed polar contaminant having a first polarity. In some embodiments, a dissolved polar contaminant may comprise a metal, an ion, a salt, an organic compound, or combinations thereof.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Some embodiments of the disclosure may be understood by referring, in part, to the present disclosure and the accompanying drawings, wherein:

FIG. 5C illustrates a section view of the ceramic element shown in FIG. 5A with the section plane generally perpendicular to the element's longitudinal axis;

Figure 1:
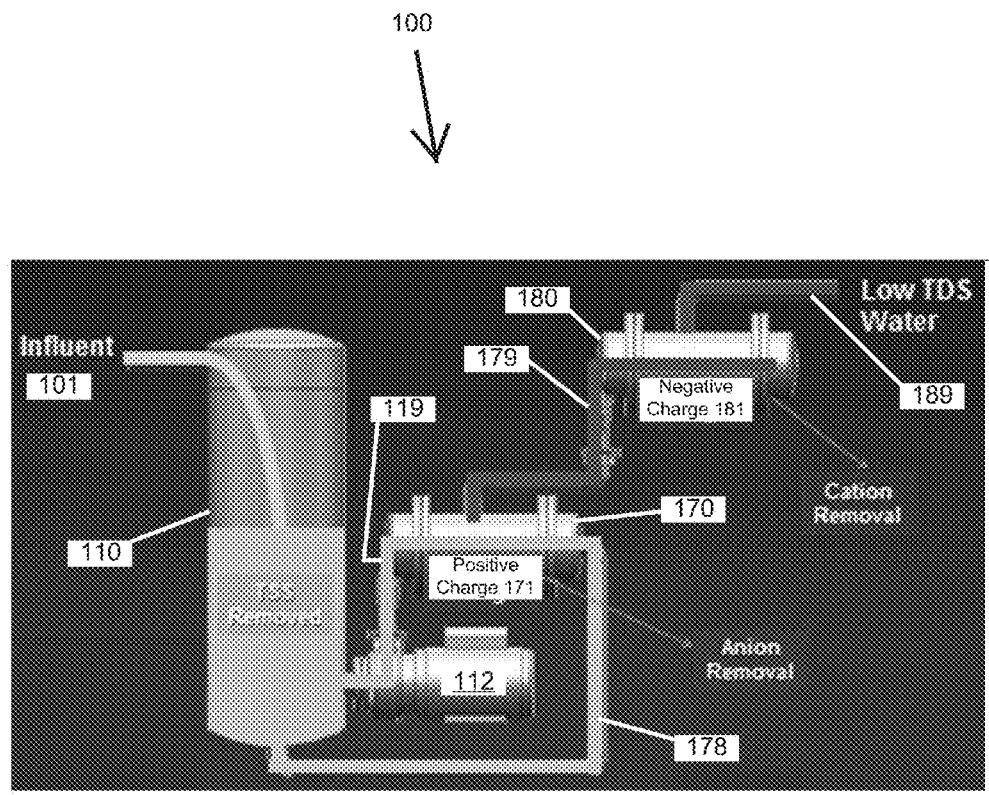
FIG. 1 illustrates a schematic view of a purification system according to a specific example embodiment of the disclosure.

Table 1 below includes the reference numerals used in this application. The thousands and hundreds digits correspond to the figure in which the item appears while the tens and ones digits correspond to the particular item indicated. Similar structures share matching tens and ones digits.

TABLE 1

Figure 2:
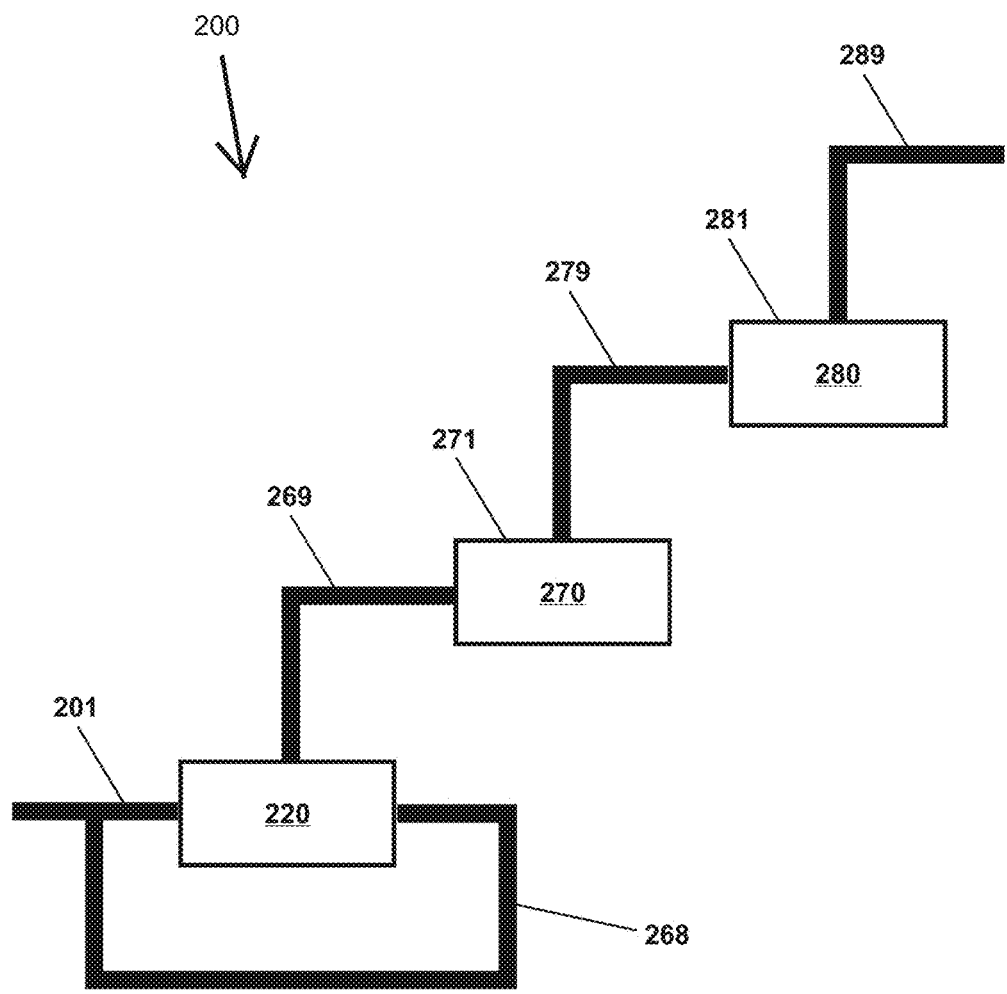
FIG. 2 illustrates a schematic view of a purification system according to a specific example embodiment of the disclosure.
Figure 3:
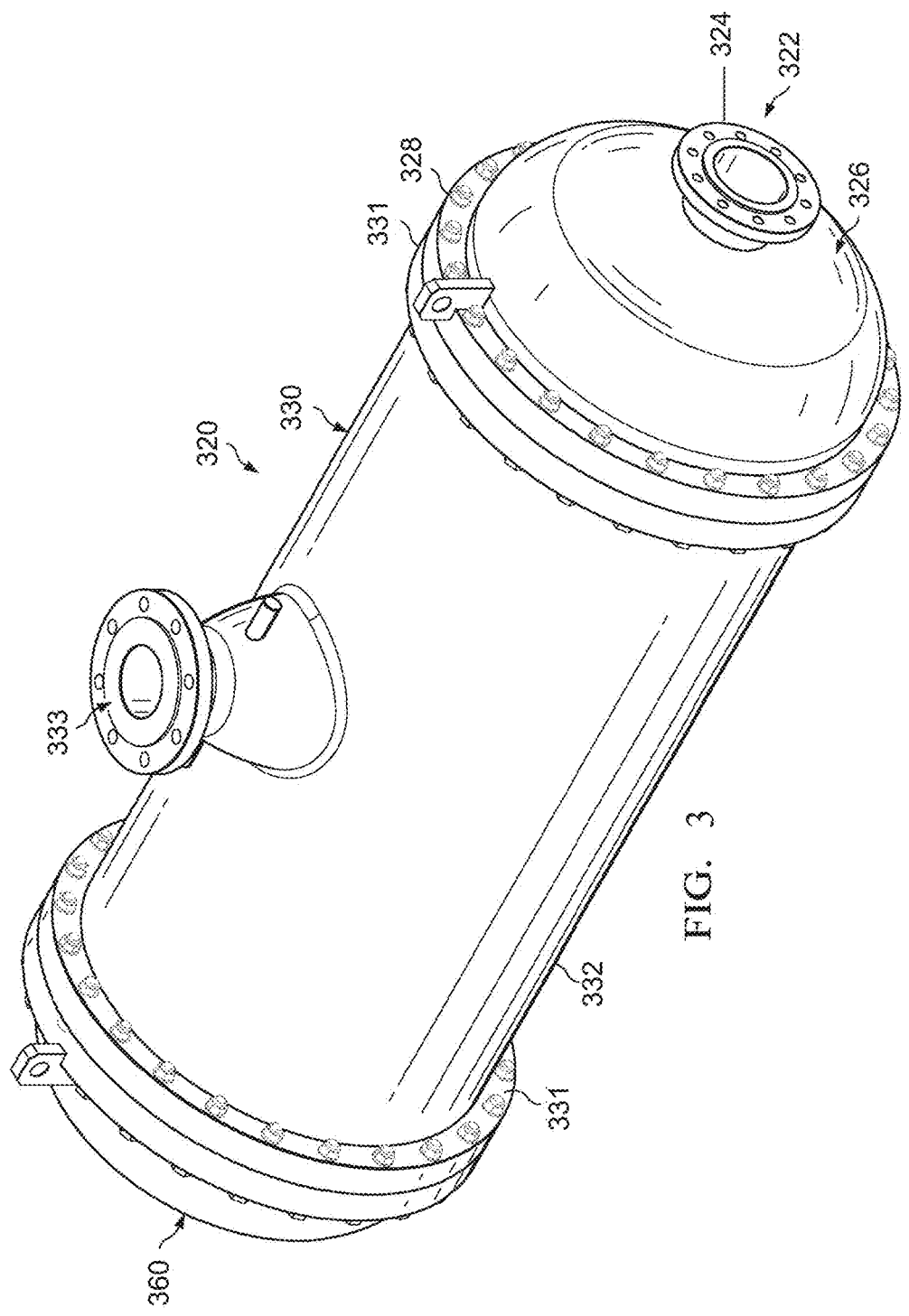
FIG. 3 illustrates a perspective view of a purification module according to a specific example embodiment of the disclosure.
Figure 4:
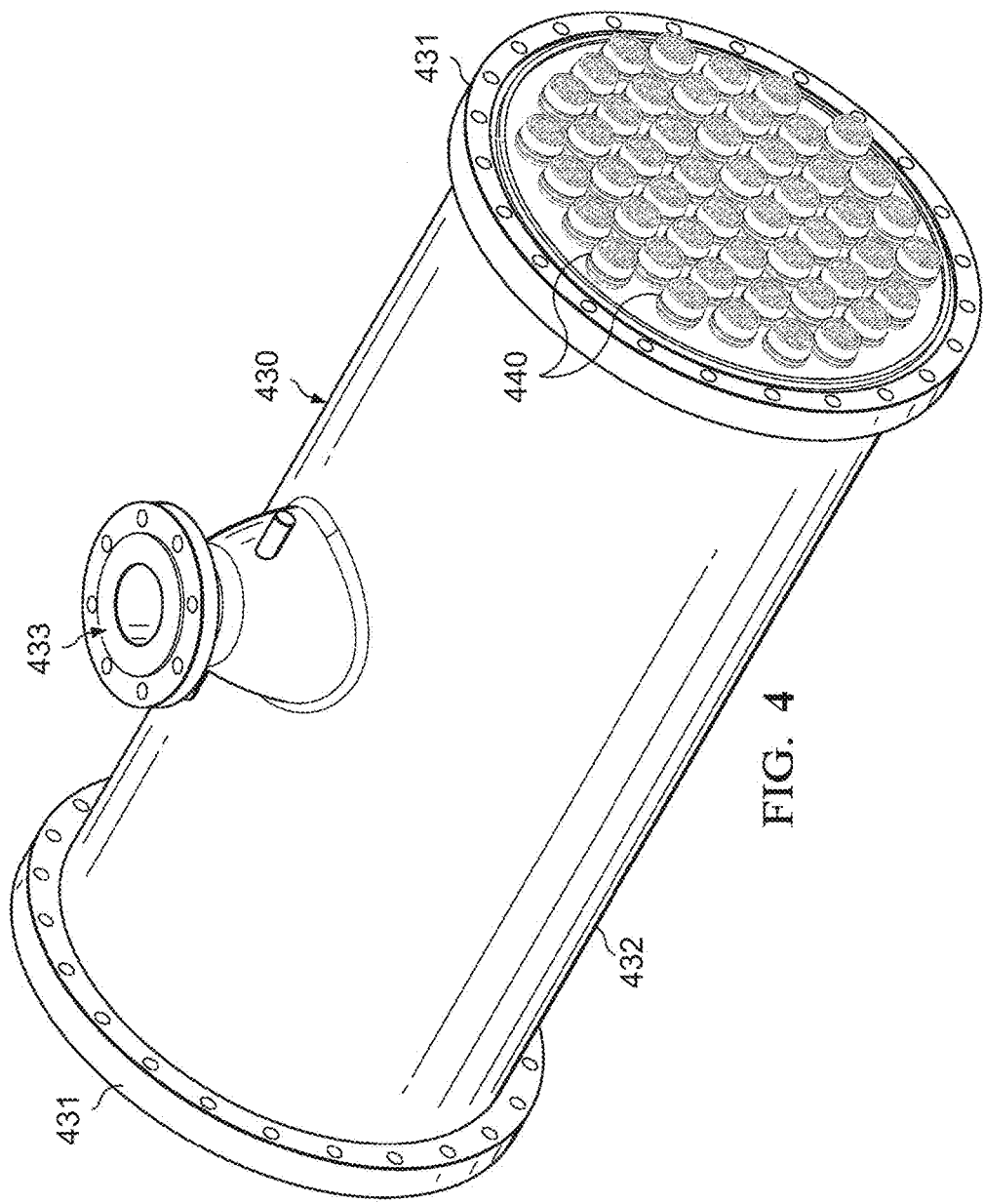
FIG. 4 illustrates a perspective view of a permeate chamber with engaged ceramic elements according to a specific example embodiment of the disclosure.
Figure 5A:
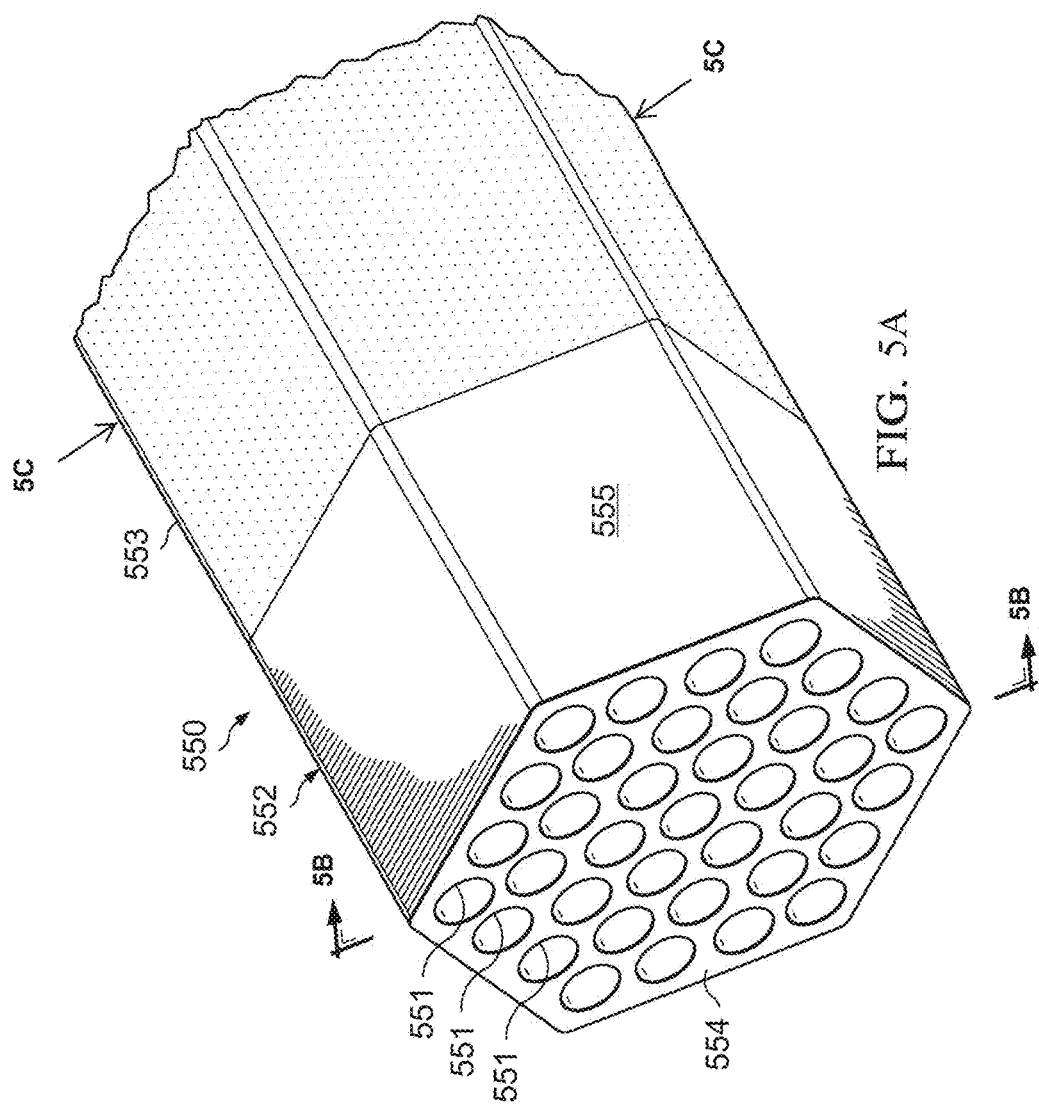
FIG. 5A illustrates a perspective view of a ceramic element according to a specific example embodiment of the disclosure.
Figure 5B:
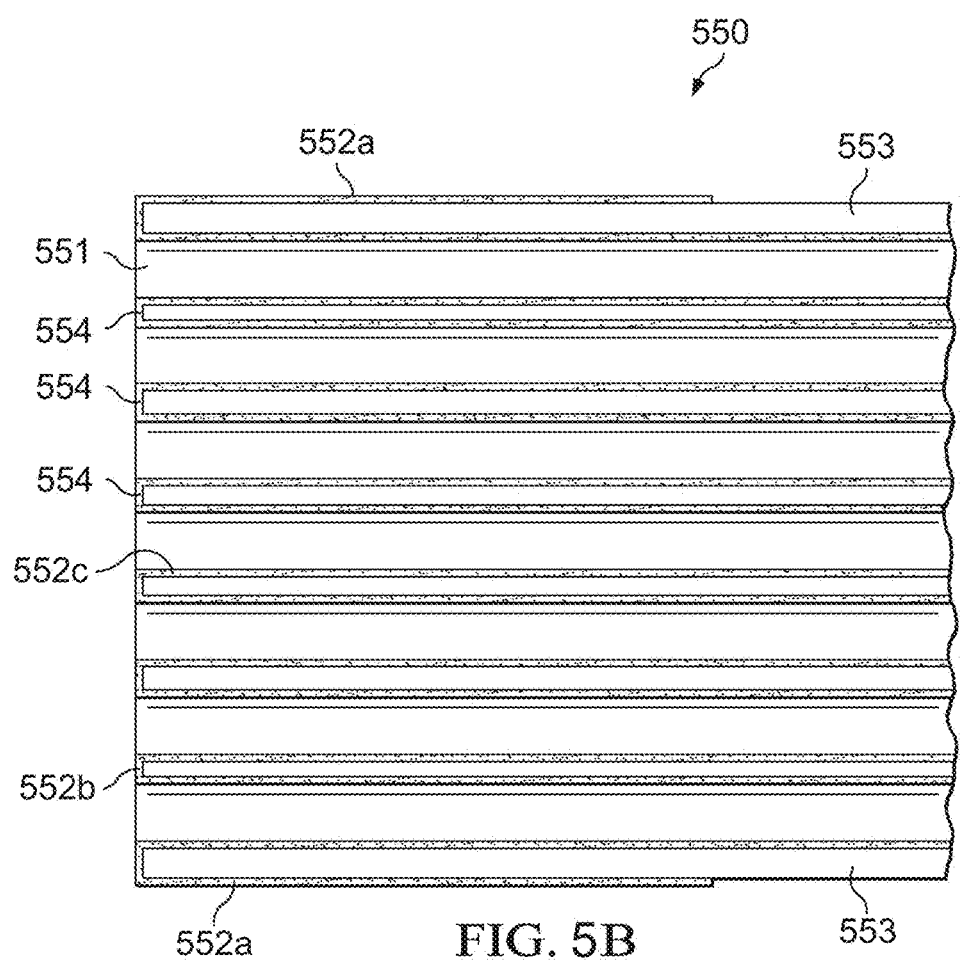
FIG. 5B illustrates a section view of the ceramic element shown in FIG. 5A with the section plane generally parallel to the element's longitudinal axis.
Figure 6:
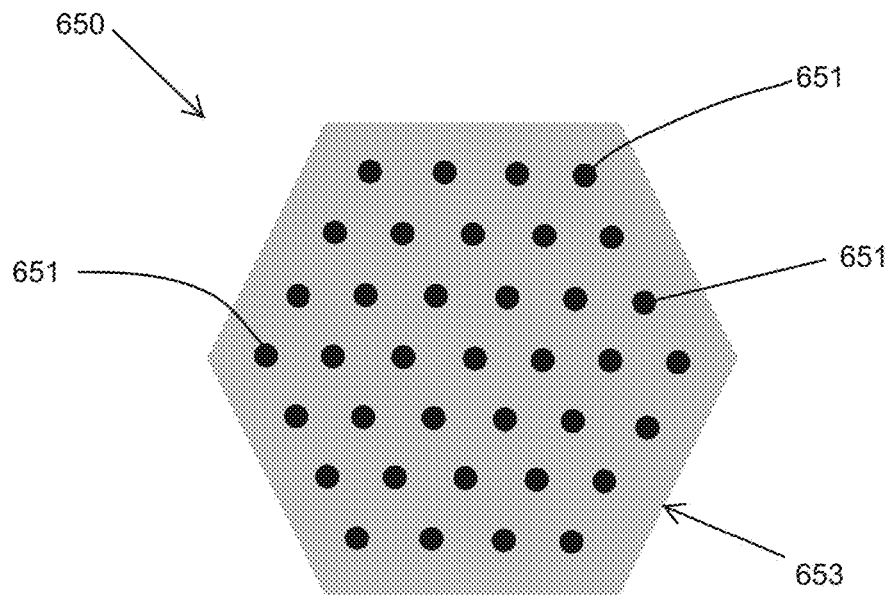
FIG. 6 illustrates a section view of a ceramic element according to a specific example embodiment of the disclosure with the section plane generally perpendicular to the element's longitudinal axis.
Figure 7:
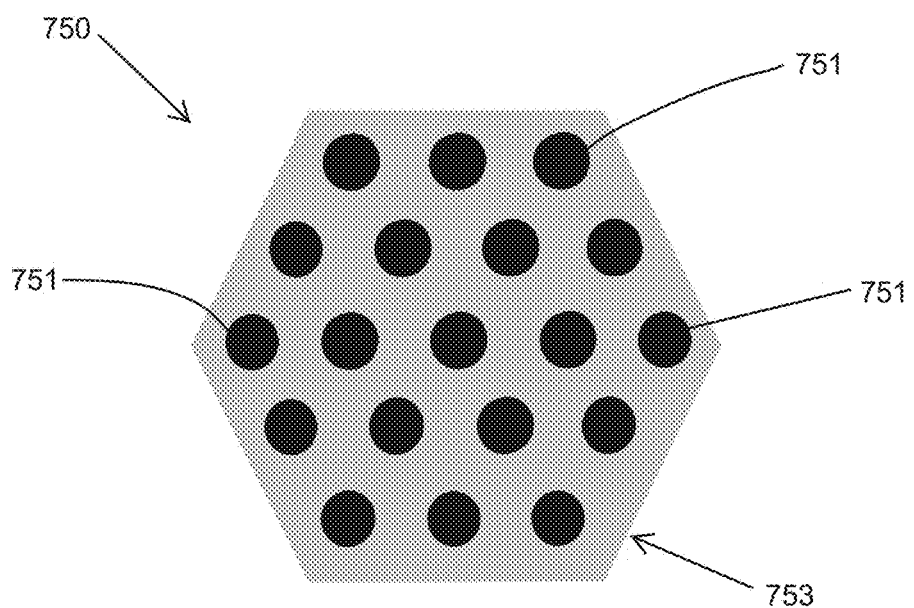
FIG. 7 illustrates a section view of a ceramic element according to a specific example embodiment of the disclosure with the section plane generally perpendicular to the element's longitudinal axis.

|  | FIG. 1 | FIG. 2 | FIG. 3 | FIG. 4 | FIG. 5A | FIG. 5B | FIG. 5C | FIG. 6 | FIG. 7 |
|---|---|---|---|---|---|---|---|---|---|
| Purification System | 100 | 200 |  |  |  |  |  |  |  |
| Contaminated Media | 101 | 201 |  |  |  |  |  |  |  |
| High Solids Contact Reactor | 110 |  |  |  |  |  |  |  |  |
| Pump | 112 |  |  |  |  |  |  |  |  |
| Media with Solids | 119 |  |  |  |  |  |  |  |  |
| Purification Module |  | 220 | 320 |  |  |  |  |  |  |
| Contaminated Media Chamber |  |  | 322 |  |  |  |  |  |  |
| Inlet |  |  | 324 |  |  |  |  |  |  |
| Contaminated Media Chamber Body |  |  | 326 |  |  |  |  |  |  |
| Flange |  |  | 328 |  |  |  |  |  |  |
| Permeate Chamber |  |  | 330 | 430 |  |  |  |  |  |
| Flange |  |  | 331 | 431 |  |  |  |  |  |
| Permeate chamber body |  |  | 332 | 432 |  |  |  |  |  |
| Outlet |  |  | 333 | 433 |  |  |  |  |  |
| Ceramic Element Assembly |  |  |  | 440 |  |  |  |  |  |
| Gasket |  |  |  | 441 |  |  |  |  |  |
| Ceramic Element |  |  |  |  | 550 | 550 | 550 | 650 | 750 |
| Channel |  |  |  |  | 551 | 551 | 551 | 651 | 751 |
| Filtration Layer |  |  |  |  | 552 | 552 | 552 |  |  |
| Outer Filtration Layer |  |  |  |  |  |  | 552a |  |  |
| Face Filtration Layer |  |  |  |  |  |  | 552b |  |  |
| Inner Filtration Layer |  |  |  |  |  |  | 552c |  |  |
| Substrate |  |  |  |  | 553 | 553 | 553 | 653 | 753 |
| Face |  |  |  |  | 554 | 554 | 554 | 654 | 754 |
| Side |  |  |  |  | 555 | 555 | 555 | 655 | 755 |
| Permeate |  |  |  |  |  |  | 556 |  |  |
| Concentrate Chamber |  |  | 360 |  |  |  |  |  |  |
| Reject Stream |  |  | 268 |  |  |  |  |  |  |
| Permeate |  |  | 269 |  |  |  |  |  |  |
| Anion Removal Unit | 170 | 270 |  |  |  |  |  |  |  |
| Positive Charge | 171 | 271 |  |  |  |  |  |  |  |

TABLE 1-continued

|  | FIG. 1 | FIG. 2 | FIG. 3 | FIG. 4 | FIG. 5A | FIG. 5B | FIG. 5C | FIG. 6 | FIG. 7 |
|---|---|---|---|---|---|---|---|---|---|
| Reject Stream | 178 | | | | | | | | |
| Permeate | 179 | 279 | | | | | | | |
| Anion Removal Unit | 180 | 280 | | | | | | | |
| Negative Charge | 181 | 281 | | | | | | | |
| Concentration Chamber | | | | | | | | 390 | |
| Partially Purified Media | 189 | 289 | | | | | | | |

DETAILED DESCRIPTION

The present disclosure relates, in some embodiments, to systems, apparatus, and methods for fluid purification (e.g., chemical-free purification). In some embodiments, the present disclosure relates to systems, apparatus, and methods for fluid purification (e.g., water). For example, a system for fluid purification may comprise a contaminated media stream, a purification module, a permeate stream, and combinations thereof. A system optionally may comprise a concentrate stream, one or more pumps, one or more valves, one or more compressed gas sources, one or more storage tanks, and combinations thereof. Concentrate may have a higher concentration of one or more contaminants than a corresponding contaminated media feed, for example, because of volume lost as permeate. In some embodiments, permeate may be collected as a finished product or subjected to further purification measures. Concentrate may be collected as a final waste product or subjected to further purification measures. Additional purification measures may include, for example, oxidation, ultraviolet irradiation, photocatalysis, filtration, and combinations thereof. For example, concentrate may be filtered twice using the same filters or different filters. Concentrate to be recycled through the same filter may or may not be combined with naïve contaminated media.

Systems and methods of the present disclosure may be suitable for fluid purification of various contaminated media. In some embodiments, a contaminated media may comprise a suspended or dissolved contaminant and a polar contaminant. A polar contaminant may have a portion having a positive polarity and/or charge and/or a portion having a negative polarity and/or charge. (e.g., a portion having a first polarity and a portion having a second polarity or a zwitterionic portion having both a first and second polarity on each particle or molecule). In some embodiments, a contaminated media may comprise some contaminants with a positive charge and some contaminants with a negative charge. A contaminated media may have a net positive polarity and/or charge or may have a net negative polarity and/or charge. For example, a contaminated media comprising both contaminants with a positive charge and contaminants with a negative charge may have a net positive charge. As another example, a contaminated media comprising both contaminants with a positive charge and contaminants with a negative charge may have a net negative charge. A system, apparatus, and/or method including a substrate (e.g., ceramic membrane) bearing a charge may facilitate removal of polar and/or charged contaminants from a fluid. A system, apparatus, and/or method including a substrate capable of bearing alternate charges may also facilitate removal of absorbed charged and/or polar contaminants to restore the filtration capacity of the substrate. In some embodiments, a system, apparatus, and/or method may be adapted to having a substrate with either a positive or a negative charge, for example, where the content of the subject fluid to be purified consistently presents contaminants of one or the other polarity or charge, thereby avoiding wasted time and resources otherwise spent on removing contaminants that are not present. In some embodiments, when desorbing absorbed contaminant from a substrate, effluent with desorbed contaminants may be collected separately from purified fluids, for example, by diverting such effluent to a separate collection tank or recycling such effluent to and mixing it with feeder fluid to be passed through the system again.

According to some embodiments, systems and methods may support adsorption of charged particles (e.g., salts) with a low (e.g., very low) pressure drop compared to reverse osmosis. In some embodiments, systems and methods may include a single ceramic element that may provide both size filtration and charge adsorption. Unlike reverse osmosis, ceramic membranes, according to some embodiments, may be cleaned with aggressive chemicals and/or may have a usable life of more than 25 years. Concentrate containing charged particles (e.g., brine) may be more concentrated than, for example, existing TDS removal technologies. In some embodiments, systems and methods (e.g., crossflow operation) may have less (e.g., substantially less) fouling than reverse osmosis membranes. In some embodiments, operating costs may be lower (e.g., substantially lower) than other desalination technologies (e.g., reverse osmosis and/or electrodialysis reversal). High surface area (e.g., extremely high surface area) of purification substrates may provide high capacity for charge removal before substrate desorption is desired or required. Other types of ceramic substrates may have increased or decreased electrical conductivity and may be more efficient by providing greater charges.

Purification Module

The present disclosure relates, in some embodiments, to purification modules. For example, a purification module may comprise (a) a contaminated media chamber having an inlet to admit contaminated media and an end plate, the end plate comprising a plurality of frustoconical openings; (b) a permeate chamber having a cylindrical body and an end plate at each end, each permeate chamber end plate comprising a plurality of frustoconical openings (e.g., corresponding to the frustoconical openings in the contaminated media chamber end plate, and/or (c) a ceramic element in fluid communication with both a contaminated media chamber and a permeate chamber. A purification module may comprise, according to some embodiments, a contaminated media chamber, a ceramic element (e.g., membrane), a permeate chamber, and/or combinations thereof. For example, a contaminated media chamber may have an interior cavity, an inlet to admit contaminated media to the cavity, and a ceramic element interface. A permeate chamber may comprise a ceramic element interface, an interior permeate cavity, and a permeate outlet in fluid communication with the interior permeate cavity.

A ceramic element may be in fluid communication with a contaminated media chamber and/or a permeate chamber. According to some embodiments, a contaminated media chamber (e.g., a contaminated media chamber cavity) may be in fluid communication with a permeate chamber ((e.g., a permeate chamber cavity) via a ceramic element. According to some embodiments, a ceramic element may engage a contaminated media chamber interface and/or a permeate chamber interface. A gasket may be included, in some embodiments, to form a fluid-tight (e.g., liquid-tight) seal (e.g., a triple seal) restricting or preventing fluid flow from a contaminated media chamber to a permeate chamber except through a ceramic element. For example, a gasket may form a seal between a contaminated media chamber and a permeate chamber, between a contaminated media chamber and the environment, between the environment and a permeate chamber, between a contaminated media chamber and the permeate chamber-facing surface of a ceramic element, between a contaminated media chamber interface and a permeate chamber interface, between a contaminated media chamber end plate and a permeate chamber end plate, and/or between a (e.g., each) frustoconical opening of a contaminated media chamber end plate and a (e.g., each) frustoconical opening of a permeate chamber end plate.

Contaminated Media Chamber

A contaminated media chamber may comprise, in some embodiments, an inlet and a ceramic element interface, according to some embodiments. A contaminated media chamber may comprise an interior cavity. An interior cavity may have any desired size and/or any desired shape. For example, a cavity may have a rounded and/or generally dome shape. A contaminated media chamber may have an outer perimeter and/or circumference. In some embodiments an outer perimeter and/or circumference may be configured as and/or define a contaminated media chamber flange. A contaminated media chamber flange may be configured to engage a permeate chamber (e.g., a permeate chamber comprising a similar or mated flange). In some embodiments, a contaminated media chamber flange may comprise a channel for a gasket, O-ring, or other seal. A contaminated media chamber channel may be positioned on one face of a flange and/or substantially parallel to an outer perimeter and/or circumference in some embodiments.

According to some embodiments, a contaminated media chamber may have one or more inlets and/or one or more outlets. For example, a contaminated media chamber may have a ceramic element interface comprising one or more outlets. Each outlet may be configured to engage a ceramic element, for example, with a substantially fluid-tight seal. In some embodiments, an outlet may have any desired shape (e.g., cylindrical, conical, frustoconical). All contaminated media chamber outlets may be positioned in an interface and/or inside a contaminated media chamber channel.

A concentrate chamber may have a structure corresponding to a contaminated media chamber and be configured to receive concentrate flowing out of each ceramic element. For example, a concentrate chamber may have a cavity, an outlet, and/or a ceramic element interface comprising at least one aperture (e.g., at least one frustoconical aperture).

A contaminated media chamber and/or a concentrate chamber may have any desired dimensions. According to some embodiments, a contaminated media chamber and/or a concentrate chamber may have a length from about 10 cm to about 150 cm, from about 20 cm to about 100 cm, from about 15 cm to about 75 cm, and/or combinations thereof. A section taken perpendicular to a chamber's longitudinal axis may have a longest dimension (e.g., diagonal or diameter) from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof. The shape and/or dimensions of a contaminated media chamber and a concentrate chamber may be the same or different.

Permeate Chamber

The present disclosure relates, in some embodiments, to a permeate chamber comprising a ceramic element interface, an interior permeate cavity, and a permeate outlet in fluid communication with the interior permeate cavity. A permeate chamber may have any desired shape. In some embodiments, a permeate chamber may have a generally cylindrical shape defining a central longitudinal axis and a cavity spanning its length. For example, up to all sections perpendicular to a central permeate chamber axis may have a generally annular shape. A permeate chamber may have a hollow, generally cylindrical shape, a first end and a second end according to some embodiments. Each end may define an aperture sized and/or shaped to receive a ceramic element interface.

A permeate chamber may have any desired dimensions. According to some embodiments, a permeate chamber may be from about 10 cm to about 5 m long, from about 50 cm to about 5 m long, from about 1 m to about 3 m long, and/or combinations thereof. A section taken perpendicular to the longitudinal axis may have a longest dimension (e.g., diagonal or diameter) from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof.

Ceramic Element

Fluid communication between a contaminated media chamber and a permeate chamber may be mediated by a ceramic element. For example, at least some fluid may flow through an inlet into a contaminated media chamber cavity, through a contaminated media chamber cavity into a ceramic element, through a ceramic element into a permeate cavity, and/or through a permeate cavity and out through a permeate outlet. A ceramic element may comprise, according to some embodiments, a filter and at least one seal gasket. A seal gasket may be configured to limit fluid movement between a contaminated media chamber and a permeate chamber to passage through a filter (bypass). For example, a ceramic element may include a seal that partially, substantially completely, or completely prevents fluid bypass.

A ceramic element may be configured to operate in any desired manner. For example, a ceramic element may be configured for dead-end or crossflow operation. An elongate element may define an interior channel with a longitudinal axis, in some embodiments. A crossflow purification module may include a ceramic element comprising an elongate channel configured such that the element's longitudinal axis is generally parallel to the direction of contaminated media flow and permeate flow is generally radially outward from the longitudinal axis.

In some embodiments, an element may have a wall defining an elongate body having at least one interior channel. An element may comprise a contaminated media-facing surface and a permeate facing surface, in some embodiments. For example, an element may define an elongate body having at least one interior surface (e.g., a contaminated media-facing surface), at least one interior channel, and an exterior surface (e.g., a permeate chamber facing surface). Contaminated fluid may enter at least one interior channel at one end and flow down the length of an element. As it travels along a channel, some fluid may traverse an element wall and form permeate. Some fluid (e.g., a reject stream) may pass all the way along the longitudinal axis of the interior channel and out the distal end.

Ceramic Membrane

A ceramic element (also called an element) may comprise, according to some embodiments, a filter of any desired size, shape, or composition. For example, a ceramic element may comprise a generally tubular filter (e.g., a ceramic filter). A ceramic element may include any desired filter or filter material. For example, a ceramic element may comprise a filter having one or more organic polymers and/or one or more ceramic materials. Examples of filters (e.g., ceramic membranes) may include microfiltration filters, ultrafiltration filters, nanofiltration filters, antimicrobial filters, maintenance-free filters, and combinations thereof. A filter may comprise an antimicrobial agent. For example, a ceramic filter may comprise silver (e.g., an impregnated, non-leachable silver). In some embodiments, a ceramic element may exclude a filter (e.g., where the element adsorbs ions).

In some embodiments, ceramic filters may be durable (e.g., more durable than organic polymer filters). For example, ceramic filters may be resistant to mechanical damage, solvents, and/or microbes. Example metrics of performance and/or resistance may be the degree of filtration provided for one or more contaminants, conductivity, usable lifespan, and/or combinations thereof. Desired performance and/or resistance may be expressed as a fraction (e.g., percentage) compared in the presence or absence of challenge, relative to another membrane, or against a threshold or target value.

In some embodiments, a ceramic membrane may comprise a ceramic element and a filter layer. For example, a ceramic membrane may comprise a filtration layer (e.g., a membrane) having smaller pores and an underlying base or substrate having larger pores. A ceramic membrane may include a filter layer only inside the channels and an epoxy coating sealing the end face. According to some embodiments, a filtration layer may instead cover an interior surface, an end face, and/or an exterior surface. For example, a filtration layer may define, be coextensive with, and/or cover a contaminated media facing surface of an element. A ceramic filtration layer may line the interior surface (e.g., channels), wrap around the face of the element, and extend a portion of the way down the outside of the element (at each end). A base may define, be coextensive with, and/or cover a permeate facing surface.

An elongate ceramic element may have a cross-section (e.g., a section perpendicular to the central longitudinal axis) with any desired regular or irregular geometric shape. For example, an element cross-section may have a shape selected from generally circular, generally elliptical, generally polygonal (e.g., hexagonal), and/or combinations thereof. An elongate element may have a central axis with one or more channels along the length of the element and generally parallel to the axis.

A ceramic element may have any desired dimensions. According to some embodiments, an elongate element may be from about 10 cm to about 5 m long, from about 50 cm to about 5 m long, from about 1 m to about 3 m long, and/or combinations thereof. A section taken perpendicular to the longitudinal axis (e.g., "diameter") may be from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof. An element may comprise one or more longitudinal channels. For example, an element may have about 37 channels arranged in 7 rows with 4-7 channels in each row. An element may have about 19 channels arranged in 5 rows with 3-5 channels in each row. Each channel may independently have any desired shape and/or dimension. In some embodiments, a channel may have a generally circular shape with a radius from about 1 mm to about 15 cm, from about 2 mm to about 10 cm, from about 5 mm to about 5 cm, from about 1 cm to about 5 cm, and/or combinations thereof.

Element channels and pores may be distinguished, according to some embodiments, on the basis of size, geometry, and/or function. For example, pores may be one or more orders of magnitude smaller than channels (e.g., 2-10 orders smaller), may define an irregular (e.g., convoluted) flow path, and/or admit only molecules below a threshold size. Channels may be one or more orders of magnitude larger than pores, define a regular flow path, and/or admit all or substantially all of a contaminated media (e.g., fluid, suspended particles, and dissolved materials).

A ceramic element, according to some embodiments, may comprise a filter and a substrate. A membrane filter may be applied to a substrate and line each of its channels. A portion of the fluid that flows into each channel passes through the membrane under the influence of back pressure. Contaminants remain inside the channels, and the cleaned fluid flows through the membrane and then through the substrate as shown in FIG. 5C. In some embodiments, a majority of a ceramic element may comprise substrate material.

A ceramic element (e.g., a substrate) may comprise up to about 100% (w/w) silicon carbide. Silicon carbide (SiC) is a semi-conductor material, meaning that it has electrical conductivity that ranks between that of an insulator and a metal. A semiconductor may change its electrical conductance with the addition of a dopant. For SiC, dopants which increase electrical conductivity may include, for example, boron, aluminum and nitrogen.

A ceramic element may be configured, in some embodiments, to selectively filter a fluid with respect to the sizes of the solids (e.g., dissolved solids, suspended solids) present. For example, a ceramic element may include a membrane having pores sized to separate, exclude, and/or remove contaminants (e.g., particles) on the basis of their size. According to some embodiments, a ceramic element may be configured to separate, exclude, and/or remove contaminants with respect to their charge. For example, a ceramic element may be configured to reduce the number of charged contaminants in a fluid (e.g., a contaminated media, a permeate produced in a prior purification step). A ceramic element may comprise one more polar and/or charged components. A ceramic element may comprise, in some embodiments, one or more components that may become charged upon application of a current. Charged contaminants may be separated, excluded, and/or removed by adsorption to an oppositely charged substrate material as fluid continues through the element according to some embodiments.

A ceramic element may be configured and operated such that polar (e.g., charged) contaminants in a fluid (e.g., a contaminated media) adhere to oppositely charged components within the ceramic element. Adhesion between these contaminants and the ceramic element may be sufficiently strong to prevent passage of at least some of the charged particles into the permeate. An electrical current and/or potential may be applied to a ceramic element, for example, sufficient to instill a net negative charge at the membrane surface. Contaminants with a positive polarity and/or charge (e.g., cations, zwitter ions) in a contaminated media passing through such a charged element may adsorb to the element with sufficient avidity that they do not continue through into the permeate. Alternatively, an electrical current may be applied to a ceramic element, for example, sufficient to instill a net positive charge at the membrane surface. Contaminants with a negative polarity and/or charge (e.g., anions, zwitter ions) in a contaminated media passing through such a charged element may adhere to the element with sufficient avidity that they do not pass through into the permeate. Two or more ceramic elements with opposite polarity may be arranged in series to form a permeate with a reduced concentration of both positively polarized and/or charged species and negatively polarized and/or charged species. For example, permeate from a first charged ceramic element may be fluidically coupled with a second charged (e.g., oppositely charged) ceramic element. At desired times (e.g., regular or irregular intervals) the electrical current and/or potential applied to a substrate may be reversed to desorb any absorbed polar and/or charged species. Where more than one charged substrate is arranged in series, alternations in charge may be coordinated to minimize desorbed materials from undesirably binding to downstream substrates.

A ceramic element may have a high (e.g., an extremely high) surface area, in some embodiments. The capacity of a ceramic element to absorb charged contaminants may be correlated with surface area. For example, high surface area may enable a ceramic element to adsorb significant masses of ions. The surface area of elements configured to selectively remove contaminants based on charge may, over time, may become saturated with adsorbed ions. Reversing the polarity of the applied current may effectively separate (e.g., desorb) the adsorbed ions from the matrix. Fluid resulting from desorption may be collected and may generate a brine having much greater concentration over traditional TDS removal technologies (less than 1% of flow). Mixing the brines from opposite polarity desorption steps may provide a concentrated salt solution.

In some embodiments, the order of the charged ceramic elements to which a contaminated fluid is exposed may be positive followed by negative or negative followed by positive. For example, one element may have a positive charge applied to it to adsorb negatively charged ions (e.g., chloride). The next element or module in series may have a negative charge applied to it in order to adsorb positively charged ions (e.g., sodium). The number of times each polarity is repeated, if at all, may be varied according to the charged contaminants (e.g., kind, concentration, pH, pI, or combinations thereof) present or potentially present in a contaminated media. The concentration of charged contaminants in a ceramic element and/or the strength of the current applied may be varied as desired or required to achieve sufficient binding of charged contaminants present or potentially present in a contaminated media. Contaminants that may be bound to a charged substrate may include a salt ion, a cation of a base, an anions of an acid, ammonia, nitrates, nitrites, organics, and combinations thereof. A dissolved polar contaminant may comprise a metal, an ion, a salt, an organic compound, and combinations thereof. According to some embodiments, each set of sequential positive and negative charged elements/modules in series comprises a single stage for ion removal. Additional stages may be added to permit removal of up to all total dissolved solids (TDS).

In some embodiments, adsorption (e.g., species and/or capacity) may be influenced by the polarity and/or amplitude of the charge present on an element. Charge on an element may arise from intrinsic charge of a dopant and/or any other means desired. For example, polarity may be induced magnetically or may arise from an applied current. Adsorption (e.g., species and/or capacity) may be influenced by the total charge, the net charge, the mass to charge ratio, and/or the charge to surface area ratio of a substrate and/or a contaminant, according to some embodiments. Adsorption (e.g., species and/or capacity) may be influenced by the distance of substrate through which a fluid passes to reach the permeate side of the element. For example, adsorption capacity of an element having narrow-diameter channels may be greater than an element having wider channels (e.g., assuming the two elements have the same or substantially the same outer dimensions and number of channels). Adsorption capacity of elements having channels of the same diameter may differ where one has fewer channels and the other has more channels—the former having the higher adsorption capacity. One or more parameters may be varied to achieve preferential adsorption to an element of one (e.g., selective adsorption) or more (e.g., semi-selective adsorption) species compared to other species of the same polarity, according to some embodiments. Purification modules configured to perform selective and/or semi-selective adsorption may be combined to produce one or more desired salts upon desorption of bound ions. For example, a desorption stream from a purification module configured and operated to selectively bind sodium ions may be combined with a desorption stream from a purification module configured and operated to selectively bind chloride ions to form a solution comprising dissolved sodium chloride.

A ceramic element configured to operate with a net charge optionally may exclude or include a membrane for removal of particles based on size. Element channels may have any desired size or arrangement. For example, all channels in an element may have the same size and may be arranged in a regular pattern of rows and columns. In some embodiments, each channel may have a diameter independent of other channels in the same element. Channels may have an irregular arrangement in some embodiments. Channels lined with a filter may be sized and arranged with a view to managing the potential pressure drop across the element when operated. Channels without a filtration layer may be sized and arranged with a view to achieving a desired adsorption capacity.

Ceramic Membrane Systems

In some embodiments, a system may include (a) a first ceramic element with a filter configured to remove particles on the basis of size, (b) a second ceramic element optionally excluding a filter and operated and/or configured to receive permeate from the first element and remove negatively charged contaminants, and (c) a third ceramic element optionally excluding a filter and operated and/or configured to receive permeate from the second element and remove positively charged contaminants. Each ceramic element may be operated to perform crossflow or dead-end purification. For example, a first element may be configured and/or operated to perform crossflow filtration and subsequent elements may be configured and/or operated to perform dead-end purification.

In some embodiments, a system may comprise no more than two operational units, wherein the first operational unit comprises at least one ceramic membrane configured to remove contaminants on the basis of size and remove charged contaminants having a first polarity and wherein the second operational unit is configured to receive fluid (e.g., permeate) from the first unit and remove charged contaminants having a polarity opposite of the first polarity. A system may comprise no more than three operational units, in some embodiments. For example, a system may comprise a first operational unit configured to remove contaminants on the basis of size, a second operational unit configured to receive fluid (e.g., permeate) from the first unit and remove charged contaminants having a first polarity, and a third operational unit to receive fluid (e.g., permeate) from the second unit and remove charged contaminants having a polarity opposite of the first polarity. While a system may include other components (e.g., pumps, valves, monitors, controllers, tanks, and pipes, among others), it may exclude any further operational units (e.g., units that separate, exclude, and/or remove contaminants from the host fluid).

Methods of Use

The present disclosure relates, according to some embodiments, to methods for using a purification system and/or apparatus. For example, a purification and/or filtration method may comprise (a) providing a media comprising contaminant solids, a dissolved salt anion, and a dissolved salt cation, (b) aggregating the contaminant solid into particles, (c) removing the particles to form a first partially purified media, (d) contacting the first partially purified media with a first substrate having a net charge of a first polarity under conditions that permit oppositely charged salt ions having a second polarity, opposite of the first, to bind to the first substrate to form a second partially purified media, and/or (e) contacting the first partially purified media with a second substrate having a net charge of the second polarity under conditions that permit oppositely charged salt ions having the first polarity to bind to the second substrate to form a second partially purified media. Aggregating dissolved contaminants into particles may comprise, according to some embodiments, oxidizing, reducing, precipitating, and/or coagulating the contaminants, for example, in a high solids contact reactor. Aggregating dissolved contaminants may comprise contacting a contaminated media with a coagulant, a base, air (e.g., with an aeration unit), dissolved oxygen (e.g., with a dissolved oxygen unit), and/or other chemicals to permit and/or promote metal oxidation, reduction, chemical precipitation, chemical coagulation, or combinations thereof. In some embodiments, the final step—step (e)—may be omitted, for example, if only charged species of one polarity (e.g., ammonia) are to be removed.

In some embodiments, the present disclosure relates to methods for using a purification system and/or apparatus. For example, a purification and/or filtration method may comprise (a) providing a media comprising a suspended or dissolved contaminant and a dissolved salt, (b) filtering the media on the basis of size to remove the suspended or dissolved contaminant to form a first partially purified media, (c) contacting the first partially purified media with a first substrate having a net charge of a first polarity under conditions that permit oppositely charged salt ions having a second polarity, opposite of the first, to bind to the first substrate to form a second partially purified media, and/or (d) optionally contacting the first partially purified media with a second substrate having a net charge of the second polarity under conditions that permit oppositely charged salt ions having the first polarity to bind to the second substrate to form a second partially purified media.

The present disclosure relates, according to some embodiments, to methods for using a purification system and/or apparatus. For example, a purification and/or filtration method may comprise contacting a contaminated fluid with a filter (e.g., a ceramic filtration membrane). According to some embodiments, contacting a contaminated fluid with a filter (e.g., a ceramic filtration membrane) may include forming a permeate (e.g., fluid that passes through filter pores) and a concentrate (e.g., fluid that does not pass through filter pores).

In some embodiments, a purification system, apparatus, and/or method may be configured to operate, according to some embodiments, continuously, substantially continuously (e.g., continuously, but for brief maintenance work), semi-continuously (e.g., less than 24 hours per day), periodically (e.g., over regular and/or irregular intervals), on-demand, or combinations thereof. In some embodiments, a purification system, apparatus, and/or method may be operated to provide microfiltration, ultrafiltration, and/or nanofiltration of a subject fluid.

According to some embodiments, filtration may be conducted (e.g., a filtration module may be operated) with fewer or no periodic testing (e.g., QA/QC testing). For example, existing water filtration systems may have to be tested daily to assess and/or ensure membrane integrity and leak-free filtration. Configuration of a ceramic element according to some embodiments may alone provide at least the same level of assurance without the need to test as frequently.

A method may comprise operating a fluid purification system with any desired throughput (e.g., contaminated media intake, permeate output, concentrate output, and/or combinations thereof), in some embodiments. For example, a method may be scalable to achieve a desired processing volume by varying the number of membrane elements and/or varying the number of modules used.

In some embodiments, a fluid purification and/or filtration method may include removing at least some particles (e.g., dissolved solids) on the basis of size and/or removing at least some contaminants (e.g., dissolved salts) on the basis of charge. For example, a method may comprise contacting a contaminated media with a ceramic element comprising a membrane to form a first permeate, optionally contacting the first permeate with a ceramic element comprising a net charge of a first polarity to form a second permeate, and optionally contacting the second permeate with a ceramic element comprising a net charge of a second polarity to form a third permeate. The first polarity may be opposite of the second polarity, in some embodiments. A first and/or second polarity may arise from an applied electric current, one or more chemical charge groups, or combinations thereof. A first ceramic element may be configured to selectively remove particles on the basis of size. Optional second and third elements may independently be configured to selectively remove contaminants on the basis of charge.

In some embodiments, as fluid passes through an element, negative ions adsorb onto the SiC substrate. Permeate may then be sent to a second element/module with a negative charge to remove the cations. With a first element that provides filtration based on size (e.g., ultrafiltration), a membrane layer may not be required in any of the subsequent elements or modules. Omission of a membrane may drastically reduce pressure drop.

Subsequent elements/modules after the first one may be operated in a dead-end mode. Cross flow may be desirable and/or required for filtration applications; for example, it may provide shear to reduce fouling. Once filtration is performed (e.g., in the first element/module), crossflow may not be required. Operating subsequent elements in a dead-end mode may reduce pump energy requirements. In some embodiments, dynamic shock (to reduce or eliminate membrane fouling) may be applied to membranes, where present.

For example, in a system configured to reduce/remove solids in an initial filtration element and charged particles (e.g., dissolved salts) in second and third elements, a dynamic shock may be applied to the first element. In some embodiments, applying a dynamic shock to all elements in a multi-element system may provide a synergistic effect.

In some embodiments, a concentrate tank may be configured as a reaction vessel for metals oxidation, coagulation, hardness removal, and/or combinations thereof. This functionality may be positioned on the concentrate side of a membrane.

Specific Example Embodiments

Specific example embodiments of a purification system are illustrated in FIG. 1. Purification system 100 comprises high solids contact reactor 110, optional pump 112 in fluid communication with high solids contact reactor 110, anion removal unit 170 in fluid communication with high solids contact reactor 110 and/or pump 112, and cation removal unit 180 in fluid communication with anion removal unit 170, wherein pump 112 is configured to deliver fluid from high solids contact reactor 110 to anion removal unit 170. High solids contact reactor 110 may be configured to reduce the hardness and/or remove contaminants. For example, high solids contact reactor 110 may be configured to contact (or permit contact between) contaminated media with (a) dissolved oxygen (e.g., sub-micron sized bubbles) and/or (b) one or more other materials or precipitating agents.

Anion removal unit 170 may be configured as a crossflow element (e.g., a nano filter) as shown or a dead-end element. Anion removal unit 170 also may comprise one or more materials having a net positive charge (e.g., innately or upon application of an electric current) to form positive charge 171 for removal of anions (e.g., molecules and/or particles with a net negative charge). Anion removal unit 170 may receive media with solids 119 from high solids contact reactor 110 and form reject stream 178 and permeate stream 179. Reject stream 178 may have a higher concentration of solids and/or lower concentration of anions than fluid 119. Permeate 179 may have lower concentrations of anions than fluid 119.

Cation removal unit 180 may be configured as a dead-end element and may comprise one or more materials having a net negative charge (e.g., innately or upon application of an electric current) to form negative charge 181 for removal of cations (e.g., molecules and/or particles with a net positive charge). Cation removal unit 180 may receive permeate 179 from anion removal unit 170 and form at least partially purified media stream 189. Stream 189 may have lower concentrations of cations than fluid 179.

In operation, contaminated media 101 enters high solids contact reactor 110 where solids are formed (e.g., by precipitation). Media with solids 119 is conveyed by pump 112 to anion removal unit 170 where solids above a size/molecular weight cut off are removed (independent of net charge) by filtration (e.g., through a membrane) and anions are removed by adsorption to positive charge 171. Media 119 is separated into reject stream 178, which is returned to high solids contact reactor, and permeate 179. Permeate 179 enters cation removal unit 180, where cations are removed by adsorption to negative charge 181 to form at least partially purified media stream 189.

Specific example embodiments of a purification system are illustrated in FIG. 2. Purification system 200 comprises purification module 220, anion removal unit 270 in fluid communication with purification module 220, and cation removal unit 280 in fluid communication with anion removal unit 270. Purification module 220 may be configured to remove contaminants on the basis of particle size and form an at least partially purified permeate, permeate 269. Purification module 220 may receive contaminated media 201 and form reject stream 268 and permeate 269. Reject stream 268 may have a higher concentration of solids than media 201. Permeate 269 may have lower concentrations of solids than media 201. For example, permeate 269 may be free or substantially free of solids.

Anion removal unit 270 may be configured as a dead-end element as shown or a crossflow element. Anion removal unit 270 also may comprise one or more materials having a net positive charge (e.g., innately or upon application of an electric current) to form positive charge 271 for removal of anions (e.g., molecules and/or ions with a net negative charge). Anion removal unit 270 may receive permeate 269 from purification module 220 and form permeate stream 279. Permeate 279 may have lower concentrations of anions than fluid 269. For example, permeate 279 may be free or substantially free of anions.

Cation removal unit 280 may be configured as a dead-end element as shown or a crossflow element and may comprise one or more materials having a net negative charge (e.g., innately or upon application of an electric current) to form negative charge 281 for removal of cations (e.g., molecules and/or particles with a net positive charge). Cation removal unit 280 may receive permeate 279 from anion removal unit 270 and form at least partially purified media stream 289. Stream 289 may have lower concentrations of cations than fluid 279. For example, permeate 289 may be free or substantially free of cations.

As shown, purification module 220, anion removal unit 270, and cation removal unit 280 may be separate from each other. For example, purification module 220, anion removal unit 270, and cation removal unit 280 may be in fluid communication with each other through interconnecting pipes. First and second polarized or polarizable materials may be selected to have opposite polarity from each other. In some embodiments, a system may include one or more valves, pumps, and/or controllers (e.g., temperature, pressure, flow rate) as desired.

In operation, contaminated media 201 enters purification module 220 where solids (e.g., precipitates) above a size/molecular weight cut off are removed (independent of net charge) by filtration (e.g., through a membrane). Resulting permeate 269 exits purification module 220 and enters anion exchange unit 270. Anions are removed by adsorption to positive charge 271. Resulting permeate 279 exits anion removal unit and enters cation removal unit 280, where cations are removed by adsorption to negative charge 281.

Specific example embodiments of a purification module are illustrated in FIG. 3. Purification module 320 comprises contaminated media chamber 322, permeate chamber 330, and concentrate chamber 360. As shown, contaminated media chamber 322 and permeate chamber 330 are secured to each other with a plurality of bolts and nuts. Concentrate chamber 360 is similarly secured to the distal end of permeate chamber 330. Contaminated media chamber 322 comprises inlet 324, contaminated media chamber body 326, and flange 328. As shown, permeate chamber 330 comprises flanges 331, permeate chamber body 332, and outlet 333.

In operation, fluid-tight seals result in contaminated media moving through inlet 324 into a cavity defined by body 326, and into and through crossflow filters positioned in permeate chamber. Fluid that permeates the filters passes through permeate outlet 333. Fluid that does not permeate the filters enters concentrate chamber 360.

Specific example embodiments of a permeate chamber with installed filter assemblies are illustrated in FIG. 4. As shown, a plurality of filtration assemblies 440 are inserted in apertures in the end plate of permeate chamber 430. Each ceramic element assembly 440 comprises an elongate ceramic element with gaskets 441 at each end. Ceramic element assemblies 440 have been positioned in apertures in the end plate of permeate chamber 430 such that gaskets 441 form fluid-tight seals at each end of permeate chamber 430.

Specific example embodiments of a ceramic membrane are illustrated in FIGS. 5A-5C. Ceramic element 550 comprises channels 551, filtration layer 552, substrate 553, face 554, and sides 555. As shown, ceramic element 550 has a generally hexagonal cross section with generally circular channels 551. Channels 551 extend through ceramic element 550 along its length. Filtration layer 552 is positioned over substrate 553 and comprises outer filtration layer 552a, face filtration layer 552b, and inner filtration layer 552c. Outer filtration layer 552a extends from face 554 along a portion of sides 555. The inner surface of each channel 551 is completely covered by inner filtration layer 552c. Face filtration layer 552b covers face 554 and is contiguous with outer filtration layer 552a and inner filtration layer 552c. Filtration layer 551 may wrap around both faces and partially cover the sides on each end of a filter. FIG. 5C illustrates a section view of a ceramic element. Contaminated fluid flows down channels 551 and permeate (arrows) passes through filtration layer 552c generally perpendicular to the contaminated media flow path.

Specific example embodiments of a ceramic membrane are illustrated in FIG. 6. Ceramic element 650 comprises channels 651, substrate 653, face 654, and sides 655. Ceramic element 650 does not include a filtration layer. As shown, ceramic element 650 has a generally hexagonal cross section with generally circular channels 651. Channels 651 extend through ceramic element 550 along its length. FIG. 6 illustrates a section view of element 650, the section generally perpendicular to the element's longitudinal axis. Channels 651, as illustrated, may have a relatively small diameter (e.g., smaller than channels 551) affording fluid a greater distance of substrate 653 through which to pass before reaching the element's permeate side. FIG. 7 illustrates a section view of element 750, the section generally perpendicular to the element's longitudinal axis. Channels 751, as illustrated, may be few in number (e.g., fewer than channels 551) affording fluid a greater distance of substrate 753 through which to pass before reaching the element's permeate side.

As will be understood by those skilled in the art who have the benefit of the instant disclosure, other equivalent or alternative compositions, devices, methods, and systems for fluid filtration can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of inlets, apertures, filters, gaskets, valves, pumps, sensors, and/or outlets may be varied. In some embodiments, filters, seal gaskets, and/or filtration assemblies may be interchangeable. Interchangeability may allow the size and/or kind of contaminates to be custom adjusted (e.g., by varying or selecting the pore size and/or kind of filter used). In addition, the size of a device and/or system may be scaled up (e.g., to be used for high throughput commercial or municipal fluid filtration applications) or down (e.g., to be used for lower throughput household or research applications) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. For example, a composition, device, and/or system may be prepared and or used as appropriate for animals and/or humans (e.g., with regard to sanitary, infectivity, safety, toxicity, biometric, and other considerations). Elements, compositions, devices, systems, methods, and method steps not recited may be included or excluded as desired or required.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for fluid filtration may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A fluid purification system comprising:
   (a) a first purification module configured to separate, exclude, and/or remove contaminants on the basis of size and form a first partially purified permeate;
   (b) a second purification module comprising a first ceramic membrane element comprising a first dopant configured to provide for a first net charge, wherein the second purification module is configured to receive the first permeate from the first unit and separate, exclude, and/or remove from the first permeate charged contaminants having a first polarity to form a second partially purified permeate; and (c) a third purification module comprising a second ceramic membrane element comprising a second dopant configured to provide for a second net charge, wherein the third purification module is configured to receive the second permeate from the second unit and separate, exclude, and/or remove from the second permeate charged contaminants having a polarity opposite of the first polarity to form an output fluid, wherein the first net charge is a net positive charge and the second net charge is a net negative charge, or wherein the first net charge is a net negative charge and the second net charge is a net positive charge.

2. A fluid purification system according to claim 1, wherein the first dopant is boron, and wherein the second dopant is selected from the group consisting of aluminum and nitrogen.

3. A fluid purification system according to claim 1, wherein the first ceramic membrane element comprises silicon carbide, and wherein the second ceramic membrane element comprises silicon carbide.

4. A fluid purification system according to claim 1, wherein the first dopant is selected from the group consisting of aluminum and nitrogen, and, wherein the second dopant is boron.

5. A fluid purification system according to claim 1, wherein the system comprises no other operation unit besides the first purification module, the second purification module, and the third purification module.

6. A contaminant removal system comprising:
(a) a contaminated media source; and
(b) a purification module series, the purification module series comprising:
(1) a first purification module
in fluid communication with the contaminated media source,
comprising a first ceramic membrane element comprising a first substrate and a first outer filtration layer membrane, and
configured to remove particles on the basis of size and form a first permeate;
(2) a second purification module
comprising a second ceramic membrane element comprising a second substrate comprising a first dopant configured to provide for a first net charge, and a second outer filtration layer membrane,
in fluid communication with the first ceramic membrane element to receive the first permeate, and configured to remove contaminants having a first contaminant net charge and form a second permeate; and
(3) a third purification module
comprising a third ceramic membrane element comprising a third substrate comprising a second dopant configured to provide for a second net charge, and, a third outer filtration layer membrane,
in fluid communication with the second ceramic membrane element to receive the second permeate, and
configured to remove contaminants having a second contaminant net charge and form a third permeate,
wherein the first net charge has the opposite polarity of the second net charge.

7. A contaminant removal system according to claim 6, wherein the first net charge is a positive charge and the second net charge is a negative charge.

8. A contaminant removal system according to claim 6, wherein the first net charge is a negative charge and the second net charge is a positive charge.

9. A contaminant removal system according to claim 6, and wherein the first ceramic membrane element is further configured to support crossflow operation, the second ceramic membrane element is further configured to support dead-end operation, the third ceramic membrane element is further configured to support dead-end operation, or combinations thereof.

10. A contaminant removal system according to claim 6, wherein the first substrate further comprises silicon carbide.

11. A contaminant removal system according to claim 6, wherein the second substrate further comprises silicon carbide.

12. A contaminant removal system according to claim 6, wherein the first dopant is boron and the second dopant is selected from the group consisting of aluminum and nitrogen, or combinations thereof.

13. A contaminant removal system according to claim 6, wherein the third substrate further comprises silicon carbide.

14. A contaminant removal system according to claim 6, wherein the first dopant is selected from the group consisting of aluminum and nitrogen, and the second dopant is boron.

15. A fluid purification system comprising:
(a) a first purification module comprising a first ceramic membrane element, the first ceramic membrane element comprising a first substrate and a first membrane and configured:
(i) to receive a contaminated media feed comprising contaminant particles and contaminant ions,
(ii) to remove from the contaminated media particles on the basis of size, and
(iii) to form a first partially purified permeate;
(b) a second purification module comprising a first net charge and a second ceramic membrane element comprising a first dopant configured to provide for the first net charge, the second ceramic membrane element comprising a second substrate and configured:
(i) to receive the first partially purified permeate from the first element,
(ii) to remove from the first partially purified permeate contaminants having a first contaminant net charge, and
(iii) form a second partially purified permeate; and
(c) a third purification module comprising a second net charge and a third ceramic membrane element comprising a second dopant configured to provide for the second net charge, the third ceramic membrane element comprising a third substrate and configured:
(i) to receive the second partially purified permeate from the second element,
(ii) to remove from the second partially purified permeate contaminants having a second contaminant net charge, and
(iii) form an output fluid comprising lower concentrations of particles and lower concentrations of ions than the contaminated media feed,
wherein the first net charge has the opposite polarity of the second net charge.

16. A fluid purification system according to claim 15, wherein the second dopant is boron and the first dopant is selected from the group consisting of aluminum and nitrogen.

17. A method for removing contaminants from a contaminated media comprising a suspended or dissolved contaminant and a polar contaminant, the method comprising:

(a) filtering the contaminated media with a first purification module on the basis of size to remove the suspended or dissolved contaminant to form a first partially purified media,
(b) contacting the first partially purified media with a second purification module comprising a first ceramic membrane element comprising a first dopant configured to provide for a first net charge under conditions that permit the dissolved polar contaminant to bind to the first ceramic membrane to form a second partially purified media,
(c) contacting the first partially purified media with a third purification module comprising a second ceramic membrane comprising a second dopant configured to provide for a second net charge under conditions that permit the dissolved polar contaminant to bind to the second ceramic membrane to form a second partially purified media,
wherein the second partially purified media has a lower concentration of the solid contaminants and a lower concentration of the dissolved polar contaminant than the contaminated media feed,
wherein the first net charge is opposite of the second net charge.

18. A method for removing contaminants from a contaminated media according to claim 17, wherein the first dopant is boron and the second dopant is selected from the group consisting of aluminum and nitrogen.

19. A method for removing contaminants from a contaminated media according to claim 17, wherein the second dopant is boron and the first dopant is selected from the group consisting of aluminum and nitrogen.

20. A method for removing contaminants from a contaminated media according to claim 17, wherein at least a portion of the dissolved polar contaminant absorbs to the first ceramic membrane, the method further comprising reversing the first net charge of the first ceramic membrane to desorb the absorbed polar contaminant having a second polarity.

21. A method for removing contaminants from a contaminated media according to claim 17, wherein at least a portion of the dissolved polar contaminant absorbs to the second ceramic membrane, the method further comprising reversing the second net charge of the second ceramic membrane to desorb the absorbed polar contaminant having a first polarity.

22. A method for removing contaminants from a contaminated media according to claim 17, wherein the dissolved polar contaminant comprises a metal, an ion, a salt, an organic compound, or combinations thereof.

* * * * *